United States Patent
Kuenemund et al.

(10) Patent No.: US 10,600,742 B2
(45) Date of Patent: Mar. 24, 2020

(54) CHIP WITH CIRCUIT FOR DETECTING AN ATTACK ON THE CHIP

(71) Applicant: Infineon Technologies AG, Neubiberg (DE)

(72) Inventors: Thomas Kuenemund, Munich (DE); Hans Friedinger, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/116,270

(22) Filed: Aug. 29, 2018

(65) Prior Publication Data
US 2019/0081008 A1    Mar. 14, 2019

(30) Foreign Application Priority Data
Sep. 11, 2017  (DE) .......... 10 2017 120 944

(51) Int. Cl.
| | |
|---|---|
| H01L 23/552 | (2006.01) |
| G06F 21/75 | (2013.01) |
| H01L 23/00 | (2006.01) |
| H03K 3/037 | (2006.01) |
| H03K 3/356 | (2006.01) |
| G06F 21/87 | (2013.01) |
| H01L 27/144 | (2006.01) |

(52) U.S. Cl.
CPC .......... *H01L 23/552* (2013.01); *G06F 21/75* (2013.01); *H01L 23/576* (2013.01); *H03K 3/0375* (2013.01); *G06F 21/87* (2013.01); *H01L 27/1443* (2013.01); *H03K 3/356* (2013.01)

(58) Field of Classification Search
CPC .......... H01L 23/552; H01L 23/576; H01L 27/1443; H03K 3/0375; H03K 3/356; G06F 21/75; G06F 21/87
USPC ........................................... 327/217
See application file for complete search history.

(56) References Cited

U.S. PATENT DOCUMENTS

| | | | |
|---|---|---|---|
| 4,430,006 A * | 2/1984 | Jetter | G04G 13/021 368/262 |
| 6,140,864 A | 10/2000 | Hirata et al. | |
| 7,532,058 B2 * | 5/2009 | Chen | G11C 17/16 327/217 |
| 8,334,707 B2 | 12/2012 | Kuenemund | |
| 2004/0262643 A1 | 12/2004 | Voldman | |

(Continued)

FOREIGN PATENT DOCUMENTS

DE    102014107455 A1    12/2015

OTHER PUBLICATIONS

German Patent Office, Office Action issued for DE 102017120944.1, 7 pgs., dated May 16, 2018.

(Continued)

*Primary Examiner* — John W Poos
(74) *Attorney, Agent, or Firm* — Schiff Hardin LLP

(57) ABSTRACT

A chip having a substrate region having a substrate contact, an RS latch having two complementary nodes representing a storage state of the RS latch, a control circuit having a control input and configured to connect one of the complementary nodes to a supply potential depending on a potential at the control input, wherein the control input is connected to the substrate contact, and an output circuit connected to an output of the RS latch and configured to trigger an alarm depending on the storage state of the RS latch.

10 Claims, 13 Drawing Sheets

(56) References Cited

U.S. PATENT DOCUMENTS

2007/0158748 A1   7/2007  Chu et al.
2011/0210782 A1   9/2011  Kuenemund
2016/0035834 A1   2/2016  Mohai et al.

OTHER PUBLICATIONS

Office Action dated Oct. 12, 2018 for German Application No. 102017120944.1.

* cited by examiner

CHIP WITH CIRCUIT FOR DETECTING AN ATTACK ON THE CHIP

BACKGROUND

Exemplary embodiments generally relate to a chip comprising a circuit for detecting an attack on the chip.

Chips having integrated circuits (ICs) which are used for security-critical applications, for example on chip cards or security controllers, are typically intended to be protected against attacks. One type of such attacks is radiation attacks, e.g. laser attacks or ion beam attacks, in the case of which the intention is to bring about a functional disturbance of a component. Possibilities for detecting such failure attacks on digital circuits are desirable. Moreover, it is desirable for an alarm signal to be triggered immediately in the case of a failure attack being detected, in order to initiate appropriate protection mechanisms at the IC level or system (e.g. chip card or controller) level.

SUMMARY

In accordance with one embodiment, a chip is provided which comprises a substrate region having a substrate contact, an RS latch having two complementary nodes representing a storage state of the RS latch, a control circuit comprising a control input and configured to connect one of the complementary nodes to a supply potential depending on a potential at the control input, wherein the control input is connected to the substrate contact, and an output circuit connected to an output of the RS latch and configured to trigger an alarm depending on the storage state of the RS latch.

In accordance with a further embodiment, a chip is provided which comprises a first doped substrate region having a first substrate terminal, a second substrate region having a second substrate terminal, said second substrate region being doped complementarily to the first doped substrate region, a field effect transistor, the gate of which is connected to the first doped substrate region and is configured to connect the second substrate region to a supply terminal depending on the potential of the first substrate region.

DRAWINGS

The figures do not reproduce the actual size relationships, but rather are intended to serve to illustrate the principles of the various exemplary embodiments. Various exemplary embodiments are described below with reference to the following figures.

DETAILED DESCRIPTION

The following detailed description refers to the accompanying figures showing details and exemplary embodiments. These exemplary embodiments are described in sufficient detail that the person skilled in the art can carry out the subject matter of the disclosure. Other embodiments are also possible and the exemplary embodiments can be modified structurally, logically and electrically, without departing from the subject matter of the disclosure. The various exemplary embodiments are not necessarily mutually exclusive, rather different embodiments can be combined with one another to give rise to new embodiments. In the context of this description, the terms "connected" and "coupled" are used to describe both a direct and an indirect connection, and a direct or indirect coupling.

Figure 1:
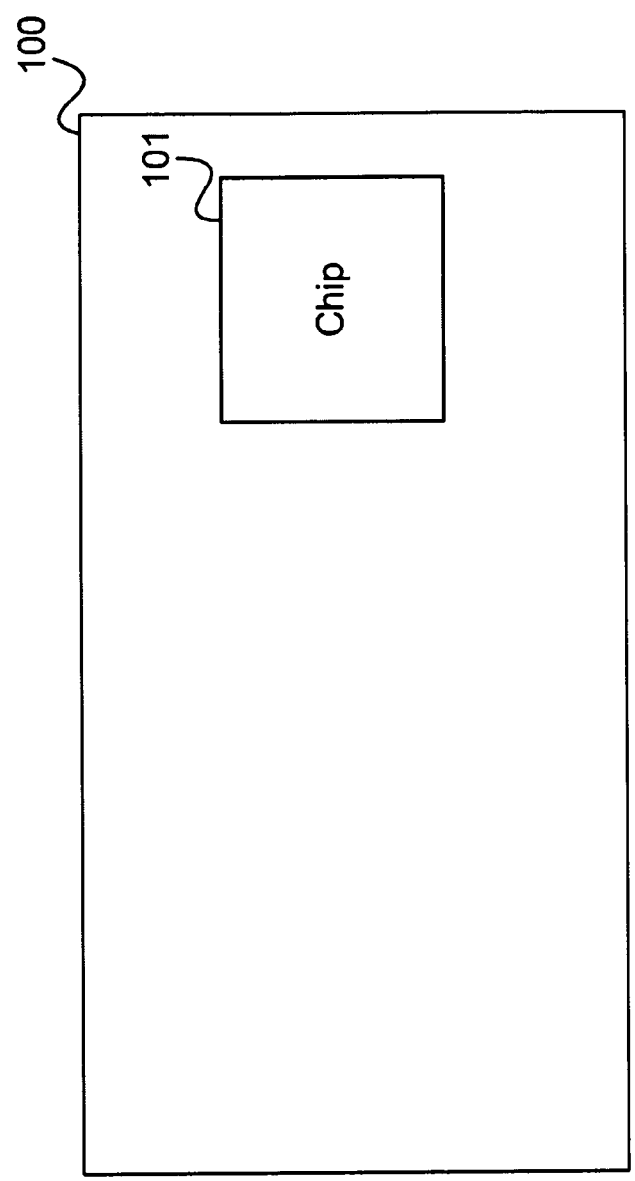
FIG. 1 shows one example of a data processing device which is intended to be protected against radiation attacks.

FIG. 1 shows one example of a data processing device 100 which is intended to be protected against radiation attacks.

The data processing device 100 can be a control unit or a microcontroller in a vehicle, e.g. an ECU (Electronic Control Unit) in an automobile. It can also be a chip card IC (Integrated Circuit) of a chip card such as a smart card having an arbitrary form factor, e.g. for a passport or for a SIM (Subscriber Identity Module).

The data processing device 100 comprises an integrated circuit, e.g. a chip 101, which is intended to be protected against radiation attacks. The chip can be a control chip and implement for example a processor, a coprocessor (e.g. a crypto-processor) and/or a memory. The chip can also for example be an RFID (Radio-Frequency Identification) chip or implement a SIM (Subscriber Identity Module) for a cellular phone. The chip can be provided for a security application and e.g. store or process secret data and/or be configured for authenticating a user.

By way of example, light sensors can be integrated on an integrated circuit (IC1) 101 for a security application, said light sensors being embodied as analog circuits and being designed to protect the entire IC or at least very large regions thereof against global (i.e. large-area) light attacks (or generally radiation attacks). However, such light sensors are typically not suitable for protecting individual, relatively small circuit blocks against local attacks (on areas of from one to a few hundred standard gate areas). Moreover, the functional principles of such analog circuits are based on different physical effects than those such as are typically utilized during failure attacks on digital circuits, e.g. static CMOS (Complementary Metal Oxide Semiconductor) gates, in order to achieve the desired malfunction. It also follows therefrom that local failure attacks on individual small circuit blocks cannot be identified with sufficient probability by these analog circuits.

One alternative is a so-called (n-type) well sensor that is used in a chip card control chip or in a security chip. In this case, physical effects such as SCR (Silicon Controlled Rectifying) or latch-up within the CMOS (Complementary Metal Oxide Semiconductor) circuit and the parasitic n-p-n-p thyristors accompanying the latter are utilized. The well sensor comprises an analog circuit which compares the present well potential with a predefined setpoint value and triggers an alarm if the present value differs from the setpoint value by a predefined magnitude. In general, however, the well sensor sensitivity decreases with the diameter of the incident (laser) light beam. Consequently, for very small beam diameters (of less than approximately 1.5 μm) the well sensor sensitivity (also depending on other parameters of the respective parasitic n-p-n-p environment) is insufficient for a seamless failure attack identification.

A further alternative is a failure attack detection, referred to as well-contact feedback failure attack detection (or WCF-FAD).

The basic concept of the well-contact feedback failure attack detection is based on physical effects that occur in any CMOS technology.

Figure 2:
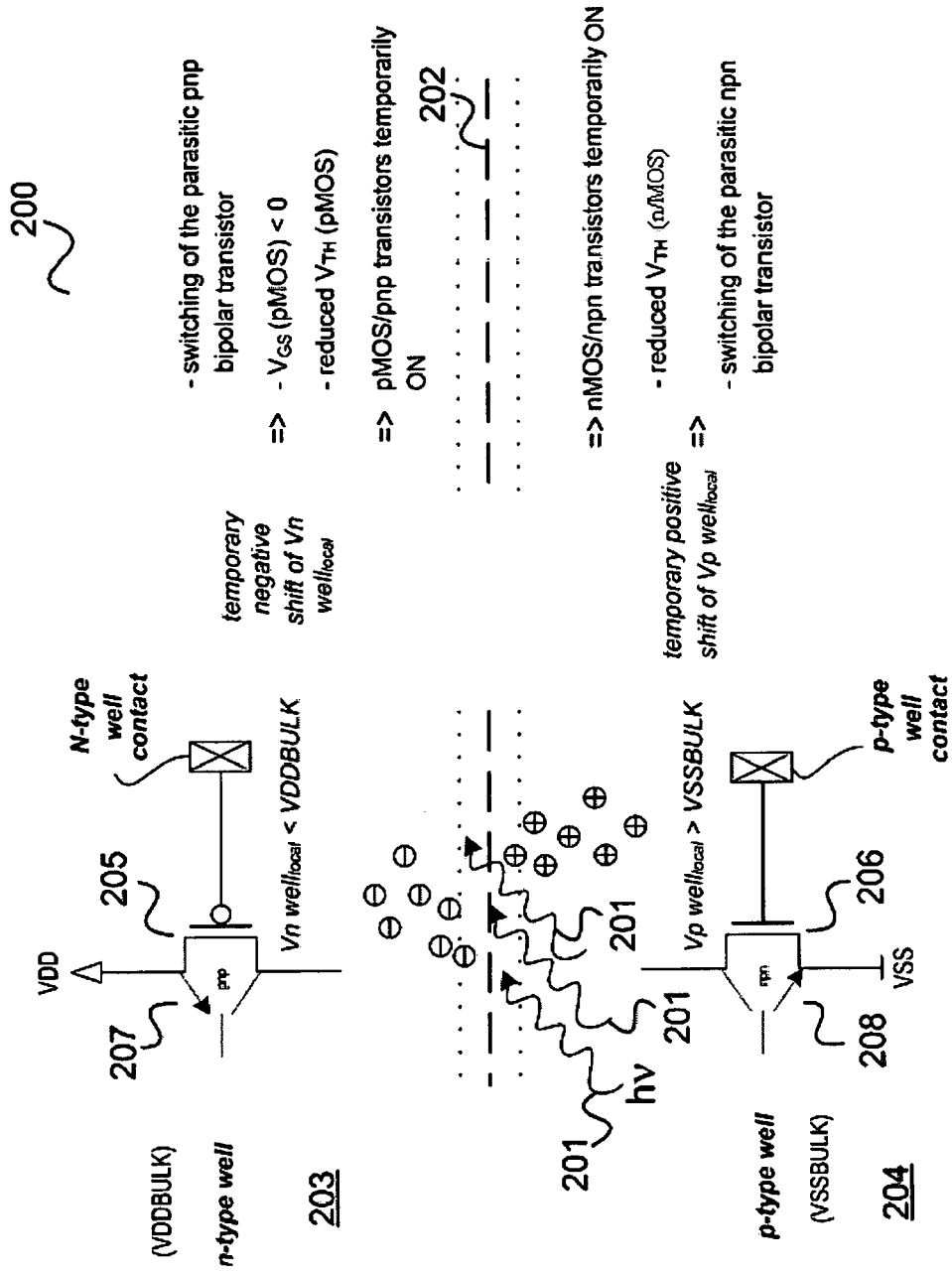
FIG. 2 illustrates a well-contact feedback failure attack detection.

FIG. 2 illustrates a well-contact feedback failure attack detection.

Photocurrent pulses 201 (represented by the photon energy hv) lead to (laser-induced) electron-hole pair formation and charge separation at the pn junction 202 (space charge zone) between n-type well 203 and p-type well 204.

The n-/p-type well-restricted majority charge carriers have comparatively long lifetimes. The pair formation and charge separation lead to a shift in the local well potentials and consequently to a combination of MOSFET (Metal Oxide Semiconductor Field Effect Transistor) threshold voltage reduction of the respective MOSFETs 205, 206 and switching of the respective parasitic bipolar transistors 207, 208, which results in the flipping of a bit (in particular in elements such as latches and flip-flops with feedback loops of a data memory) as desired by an attacker.

It should be noted that, (insofar as meaningful) whenever a well contact is mentioned in the examples, this can also be a contact directly with the substrate (without a well), for example because the substrate has the respective doping and a well is therefore not required. In particular, in an example in which mention is made of a p-type well contact and an n-type well contact, one of the contacts can be a contact directly with the substrate if a well is provided only for one of the two dopings. Hereinafter the term substrate contact is also used to denote both a well contact and a contact with the substrate without a well.

Figure 3:
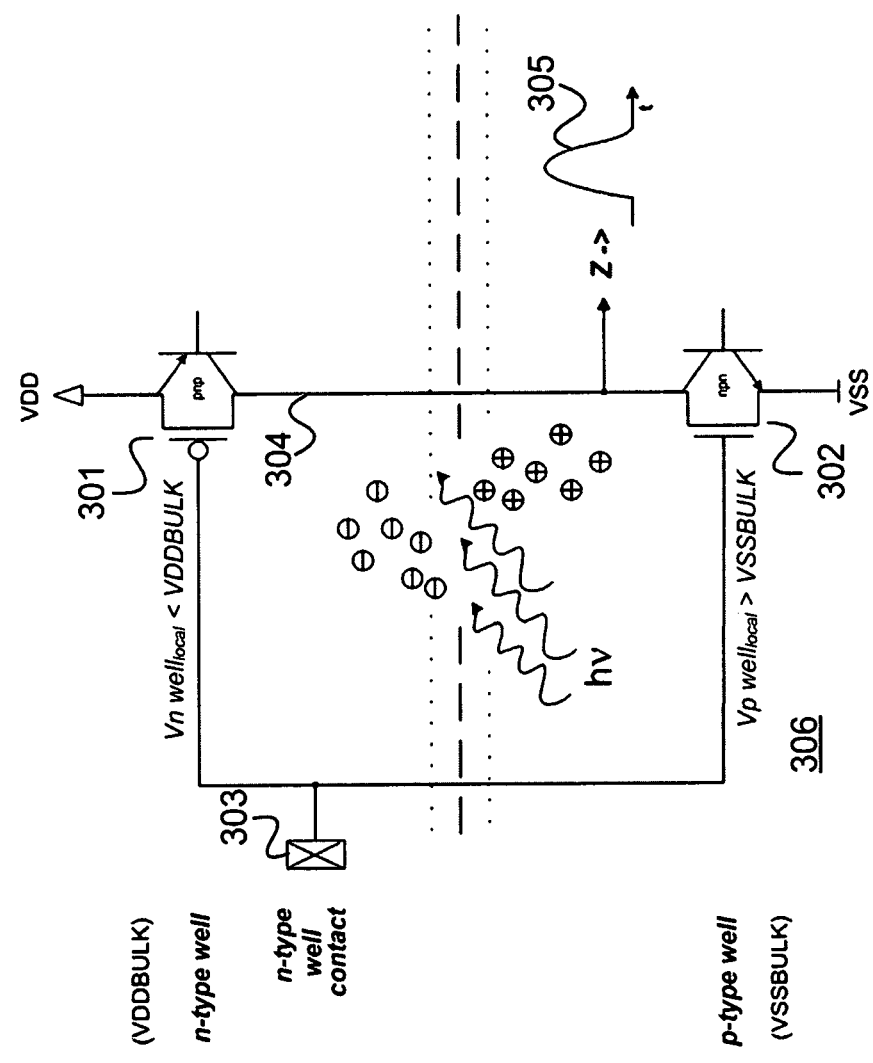
FIG. 3 shows a circuit for n-type well contact-based failure attack detection which is based on the physical effects shown in FIG. 2.

FIG. 3 shows a circuit 300 for n-type well contact-based failure attack detection which is based on the physical effects shown in FIG. 2.

The circuit 300 comprises a p-type MOSFET 301 corresponding to the p-type MOSFET 205 and an n-type MOSFET 302 corresponding to the n-type MOSFET 206. The gate of the p-type MOSFET 301 and the gate of the n-type MOSFET 302 are connected to an n-type well contact 303. Moreover, the drains of the p-type MOSFET 301 and of the n-type MOSFET 302 are connected to one another by means of a line 304.

In the case of a radiation attack, on account of the effects described with reference to FIG. 2 a voltage pulse 305 occurs at an output Z of the line 304, which voltage pulse can be detected e.g. by means of an asynchronous flip-flop. An alarm circuit can then trigger an alarm in reaction to the detected pulse.

Figure 4:
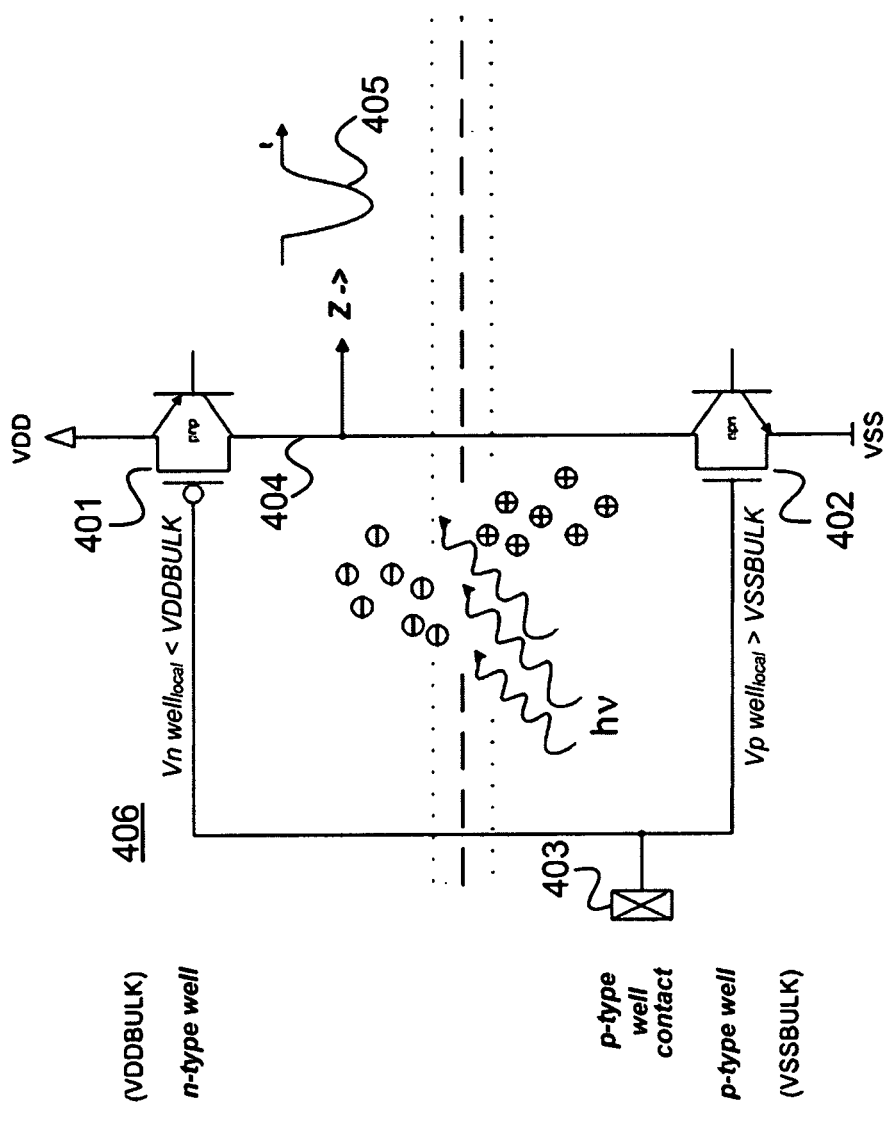
FIG. 4 shows a circuit for p-type well contact-based failure attack detection which is based on the physical effects shown in FIG. 2.

FIG. 4 shows a circuit 400 for p-type well contact-based failure attack detection which is based on the physical effects shown in FIG. 2.

The circuit 400 comprises a p-type MOSFET 401 corresponding to the p-type MOSFET 205 and an n-type MOSFET 402 corresponding to the n-type MOSFET 206. The gate of the p-type MOSFET 401 and the gate of the n-type MOSFET 402 are connected to a p-type well contact 403. Moreover, the drains of the p-type MOSFET 401 and of the n-type MOSFET 402 are connected to one another by means of a line 404.

In the case of a radiation attack, on account of the effects described with reference to FIG. 2 a voltage pulse 405 occurs at an output Z of the line 404, which voltage pulse can be detected e.g. by means of an asynchronous flip-flop. An alarm circuit can then trigger an alarm in reaction to the detected pulse.

As shown in FIG. 3 and FIG. 4, the involved parasitic bipolar transistors of the MOSFETs 301, 302, 401, 402 inhibit one another both for the n-type well-based failure detection (FIG. 3) and for the p-type well-based failure detection (FIG. 4). This results in radiation-induced pulses 305, 405 at the inverter output Z which are lower than they might be if the parasitic bipolar transistors did not inhibit one another.

A description is given below of exemplary embodiments in which the detection probability and hence the protection level are increased by virtue of a cooperation between the parasitic bipolar transistors (instead of their acting against one another) being achieved in the case of the failure detection principle described in FIG. 3 and FIG. 4.

Figure 5:
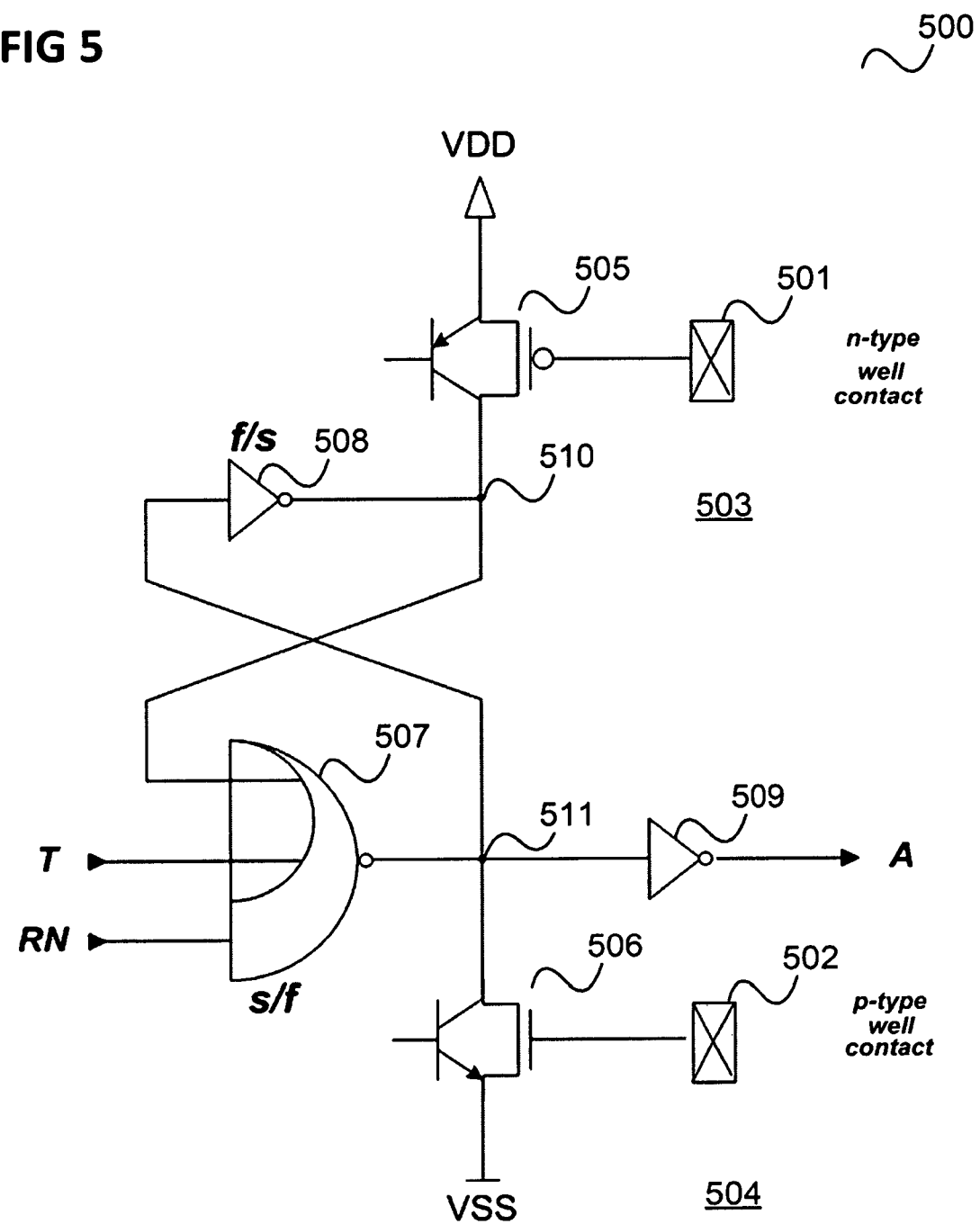
FIG. 5 shows a circuit for failure attack detection which is based on a cooperation between an n-type well contact and a p-type well contact.

FIG. 5 shows a circuit 500 for failure attack detection which is based on a cooperation between an n-type well contact 501 and a p-type well contact 502.

The circuit 500 can be regarded as a failure detection based on an RS flip-flop or RS latch in which the n-type well 503 and the p-type well 504 cooperate.

As in FIG. 2, a p-type MOSFET 505 is provided in the n-type well and an n-type MOSFET 506 is provided in the p-type well. The gate of the p-type MOSFET 505 is connected to the n-type well contact 501 and the gate of the n-type MOSFET 506 is connected to the p-type well contact 502.

The drain of the p-type MOSFET 505 is connected to a first OR input of a gate 507, which receives a test input signal T at a second OR input, ORs the signals at the two OR inputs and NANDs the result with a reset input signal RN. The output of the gate 507 is connected to the drain terminal of the n-type MOSFET 506 and to the input of a first inverter 508, the output of which is connected to the drain terminal of the p-type MOSFET 505. The output of the gate 507 is additionally connected to the input of a second inverter 509, the output of which is the alarm output of the failure attack detection circuit 500 with alarm output signal A.

The gate 507 and the first inverter 508 form an RS latch having the two complementary nodes 510, 511 (output of the first inverter 508 and output of the gate 507) representing a storage state of the RS latch.

The failure attack detection circuit 500 can consist of individual (stand-alone) gates or be integrated (e.g. within a latch or a flip-flop). The failure attack detection circuit 500 realizes a testable failure attack detection line: the test input signal T triggers a test alarm A=1 at the output. The reset input signal RN resets the RS flip-flop formed by the gate 507 and the first inverter 508, such that A=0. For T=0 and after resetting (e.g. after RN has been set to 0 and then to 1 again), an alarm (A=1) as described with reference to FIG. 1 can be triggered by a radiation attack.

Figure 6:
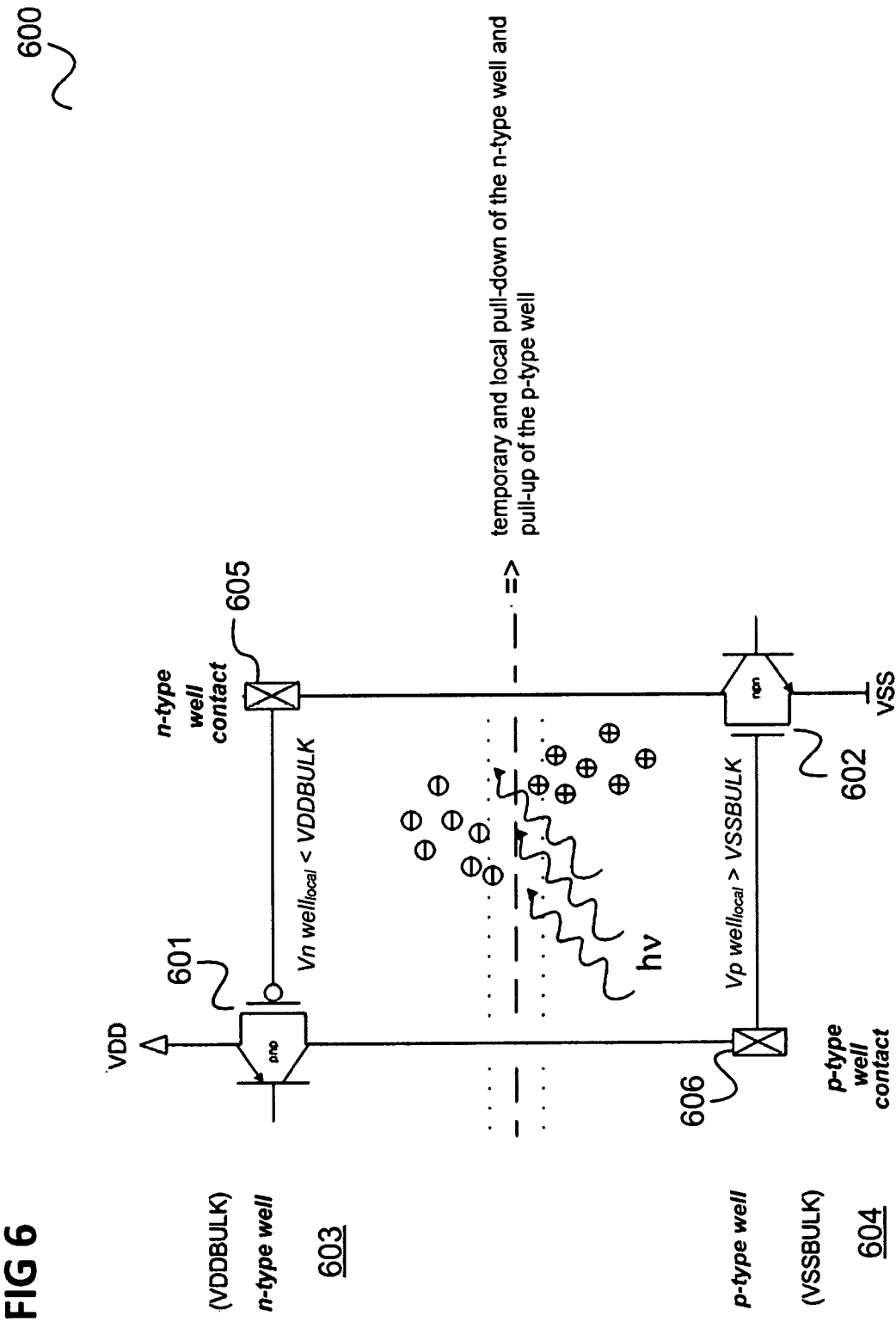
FIG. 6 shows a circuit for failure attack detection which is based on a mutual feedback of a p-type MOSFET in an n-type well and an n-type MOSFET in a p-type well.

FIG. 6 shows a circuit 600 for failure attack detection which is based on a mutual feedback of a p-type MOSFET 601 in an n-type well 603 and an n-type MOSFET 602 in a p-type well 604.

An n-type well contact 605 is connected to the gate of the p-type MOSFET 601 and a p-type well contact 606 is connected to the gate of the n-type MOSFET 602.

If the potential in the n-type well 603 falls below the provided n-type well potential (VDDBULK) by approximately a p-type MOSFET threshold voltage, then the p-type MOSFET 601 connects the p-type well contact 606 (and thus the p-type well 604) to VDD.

Conversely, if the potential in the p-type well 604 rises above the provided p-type well potential (VSSBULK) by approximately an n-type MOSFET threshold voltage on account of a radiation attack, then the n-type MOSFET 602 connects the n-type well contact 605 (and thus the n-type well 603) to VSS.

The circuit 600 thus realizes a feedback between the wells 603, 604 and a sufficient change in the potential in one of the two wells on account of a radiation attack also brings about a change in the other well and thus amplifies the effect of the radiation attack on the substrate.

The time for charging or discharging a well 603, 604 by means of the current I(MOS) through a MOSFET 601, 602 is for example:

$$\Delta t = \int_0^{\Delta V} \frac{C}{I(V)} dV \approx \frac{C \Delta V}{I} = 200 \text{ ps}$$

assuming the capacitance C of the well of approximately 10 fF, a maximum potential difference ΔV of approximately IV and an average current I(MOS) of approximately 50 µA.

In accordance with one embodiment, a well sensor is provided, which detects a change in a well potential (of the n-type well 603 or of the p-type well 604 or of both wells) and outputs an alarm signal in the event of a change above a specific threshold value. An alarm on account of a failure attack is therefore not triggered by the circuit 600 itself, but rather by a well sensor, e.g. an analog circuit that is part of a well sensor.

The mutual feedback of the wells 603, 604 increases the sensitivity with which a radiation attack which changes the potential of a well 603, 604 is detected.

A significant improvement in the triggering sensitivity of a well sensor can actually be achieved. This has the consequence that a well sensor can be set to be less sensitive in order to be more robust vis à vis load changes, without the protection against radiation attacks being lost. The circuit 600 acts as an accelerator and reacts particularly exclusively to radiation attacks such as laser beams or other highly ionizing radiation, with the result that the probability of a false alarm is low.

The circuit 600 can be used in a manner implemented within frequently used regular gates (e.g. latches), in order to achieve an appropriate sensor coverage of a chip.

The detection principle in FIG. 6 can be regarded as a CMOS thyristor-based detection principle for accelerating the detection by a well sensor, wherein the triggering of parasitic pnpn thyristors is stimulated in the latter. Accordingly, the circuit 600 can be regarded as a CMOS thyristor structure.

Figure 7:
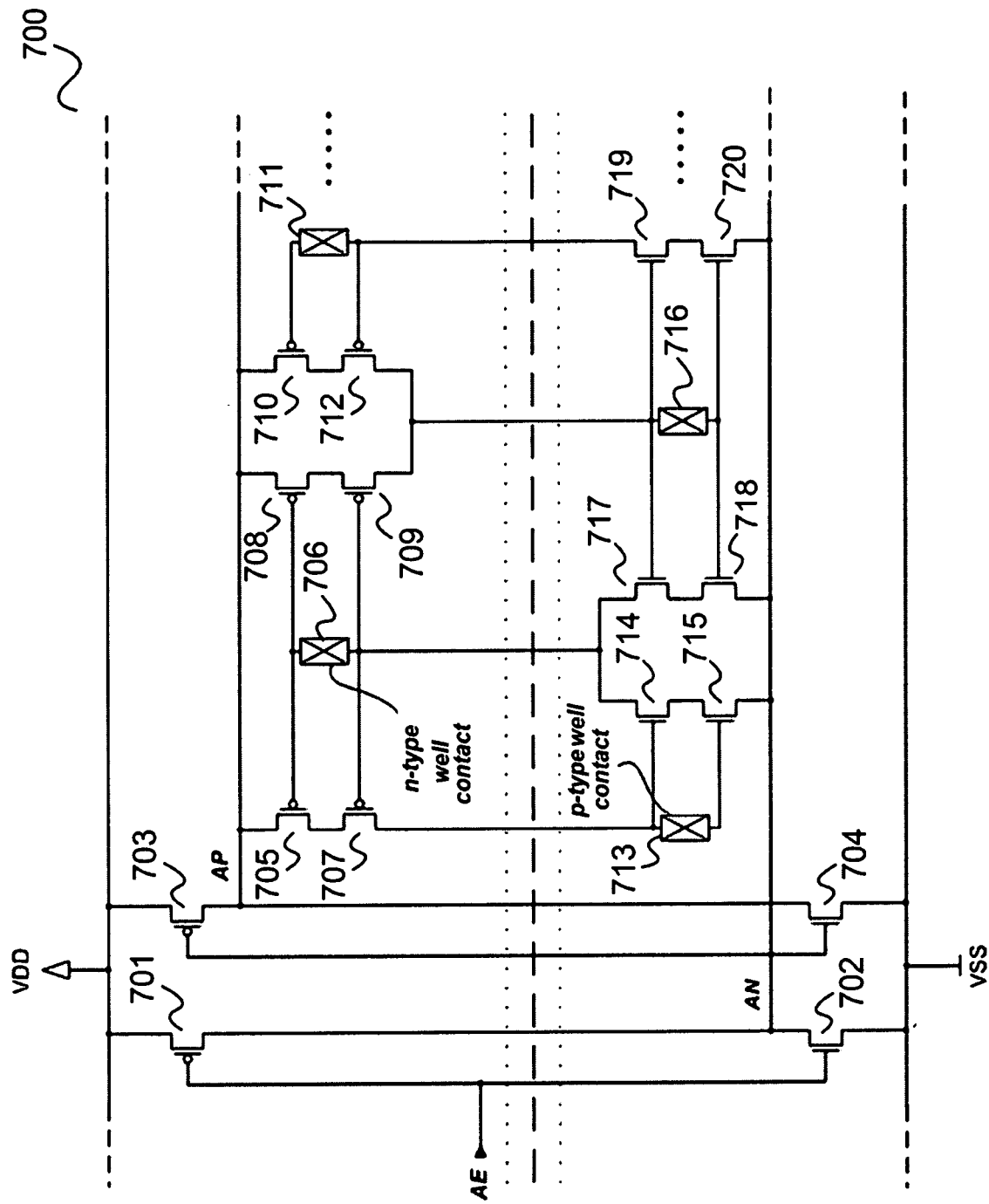
FIG. 7 shows a circuit which is a variant of the circuit for integration into a system in which great load changes temporarily occur on the supply lines VDD and/or VSS.

FIG. 7 shows a circuit 700 that is a variant of the circuit 600 for integration into a system (e.g. a chip) in which great load changes can temporarily occur on the supply lines VDD and/or VSS. In this regard, an activation signal AE is provided in the circuit 700, which activation signal makes it possible to switch off the circuit temporarily in order to prevent a potential incorrect behavior on account of extreme VDD fluctuations (which can be brought about by load changes). Furthermore, in the circuit 700, instead of the MOSFETs 601, 602, provision is made of field effect transistor arrangements having series circuits comprising MOSFETs (and parallel circuits comprising such series circuits), which in turn reduce the risk of incorrect behavior in the event of load changes.

The activation signal AE is fed to the gate of a first p-type MOSFET 701, the source of which is connected to the high supply potential VDD and the drain of which is connected to the drain of a first n-type MOSFET 702, to the gate of which the activation signal AE is likewise fed and the source of which is connected to the low supply potential VSS. The MOSFETs 701, 702 thus form an inverter with output signal AN.

The signal AN is fed to the gate of a second p-type MOSFET 703, the source of which is connected to the high supply potential VDD and the drain of which is connected to the drain of a second n-type MOSFET 704, to the gate of which the signal AN is likewise fed and the source of which is connected to the low supply potential VSS. The MOSFETs 703, 704 thus likewise form an inverter, the output signal of which is designated by AP.

The signal AP is fed to the source of a third p-type MOSFET 705, the gate of which is connected to a first n-type well contact 706 and the drain of which is connected to the source of a fourth p-type MOSFET 707, the gate of which is likewise connected to the first n-type well contact 706.

The signal AP is additionally fed to the source of a fifth p-type MOSFET 708, the gate of which is connected to the first n-type well contact 706 and the drain of which is connected to the source of a sixth p-type MOSFET 709, the gate of which is likewise connected to the first n-type well contact 706.

The signal AP is additionally fed to the source of a seventh p-type MOSFET 710, the gate of which is connected to a second n-type well contact 711 and the drain of which is connected to the source of an eighth p-type MOSFET 712, the gate of which is likewise connected to the second n-type well contact 711.

The drain of the fourth p-type MOSFET 707 is connected to a first p-type well (or substrate) contact 713, which is connected to the gate of a third n-type MOSFET 714 and to the gate of a fourth n-type MOSFET 715. The drain of the third n-type MOSFET 714 is connected to the first p-type well contact 706 and the source of the third n-type MOSFET 714 is connected to the drain of the fourth n-type MOSFET 715. AN is fed to the source of the fourth n-type MOSFET 715.

The drain of the sixth p-type MOSFET 709 is connected to a second p-type well (or substrate) contact 716, which is connected to the gate of a fifth n-type MOSFET 717 and to the gate of a sixth n-type MOSFET 718. The drain of the fifth n-type MOSFET 717 is connected to the first p-type well contact 706 and the source of the fifth n-type MOSFET 717 is connected to the drain of the sixth n-type MOSFET 718. AN is fed to the source of the sixth n-type MOSFET 718.

The second p-type well contact 716 is additionally connected to the gate of a seventh n-type MOSFET 719 and to the gate of an eighth n-type MOSFET 720. The drain of the seventh n-type MOSFET 719 is connected to the second p-type well contact 711 and the source of the seventh n-type MOSFET 719 is connected to the drain of the eighth n-type MOSFET 720. AN is fed to the source of the eighth n-type MOSFET 720.

The circuit 700 realizes a well sensor accelerator that is switchable by means of the activation signal AE.

Figure 8:
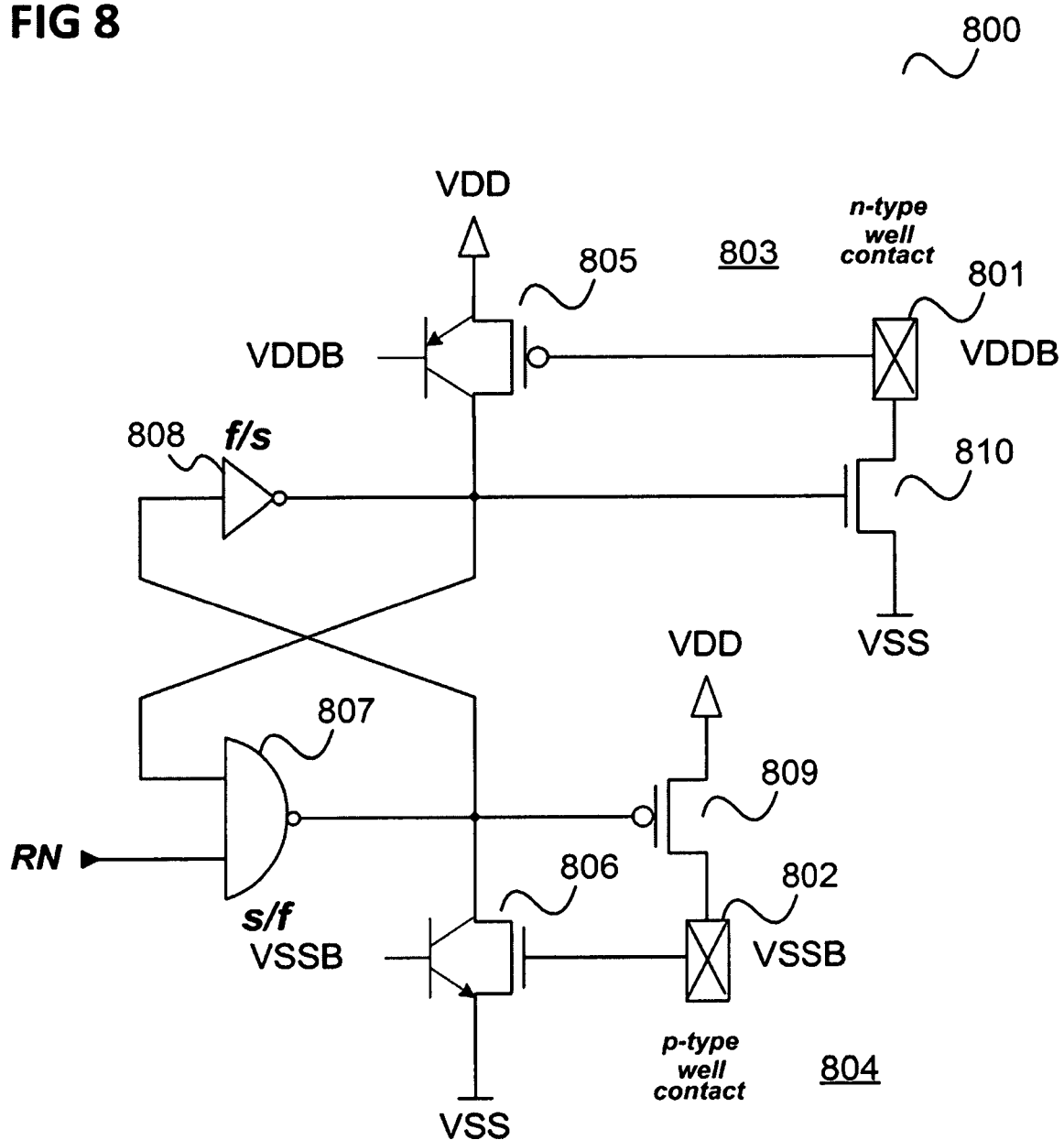
FIG. 8 shows a circuit which can be regarded as a combination of the circuits from FIG. 5 and FIG. 6.

FIG. 8 shows a circuit 800 that can be regarded as a combination of the circuits 500 and 600 (although without test signal input and alarm output).

As in the case of the circuit 500 in FIG. 5, a first p-type MOSFET 805 is provided in the n-type well and a first n-type MOSFET 806 is provided in the p-type well. The gate of the first p-type MOSFET 805 is connected to an n-type well contact 801 in an n-type well 803, and the gate of the first n-type MOSFET 806 is connected to a p-type well contact 802 in a p-type well 804.

The drain of the first p-type MOSFET 805 is connected to a first input of a NAND gate 807, which obtains a reset input signal RN at its second input. The output of the NAND gate 807 is connected to the drain terminal of the first n-type MOSFET 806 and to the input of an inverter 808, the output of which is connected to the drain terminal of the first p-type MOSFET 805.

The output of the NAND gate 807 is additionally connected to the input of a second p-type MOSFET 809, the source of which is connected to the high supply potential VDD and the drain of which is connected to the p-type well contact 802.

The output of the inverter 808 is additionally connected to the gate of a second n-type MOSFET 810, the source of which is connected to the low supply potential VSS and the drain of which is connected to the n-type well contact 801.

In addition to the switchover of the RS flip-flop (or RS latch) of the circuit 500, in the circuit 800 the n-type well is pulled down and the p-type well is pulled up as soon as a failure attack has been detected (i.e. the RS flip-flop formed from gate 807 and inverter 808 has changed its state). As in the example in FIG. 6, a well sensor registers the resulting shift in the n-type well potential and RN can subsequently be activated, whereupon the pull-down/pull-up MOSFETs 809, 810 are deactivated again.

Figure 9:
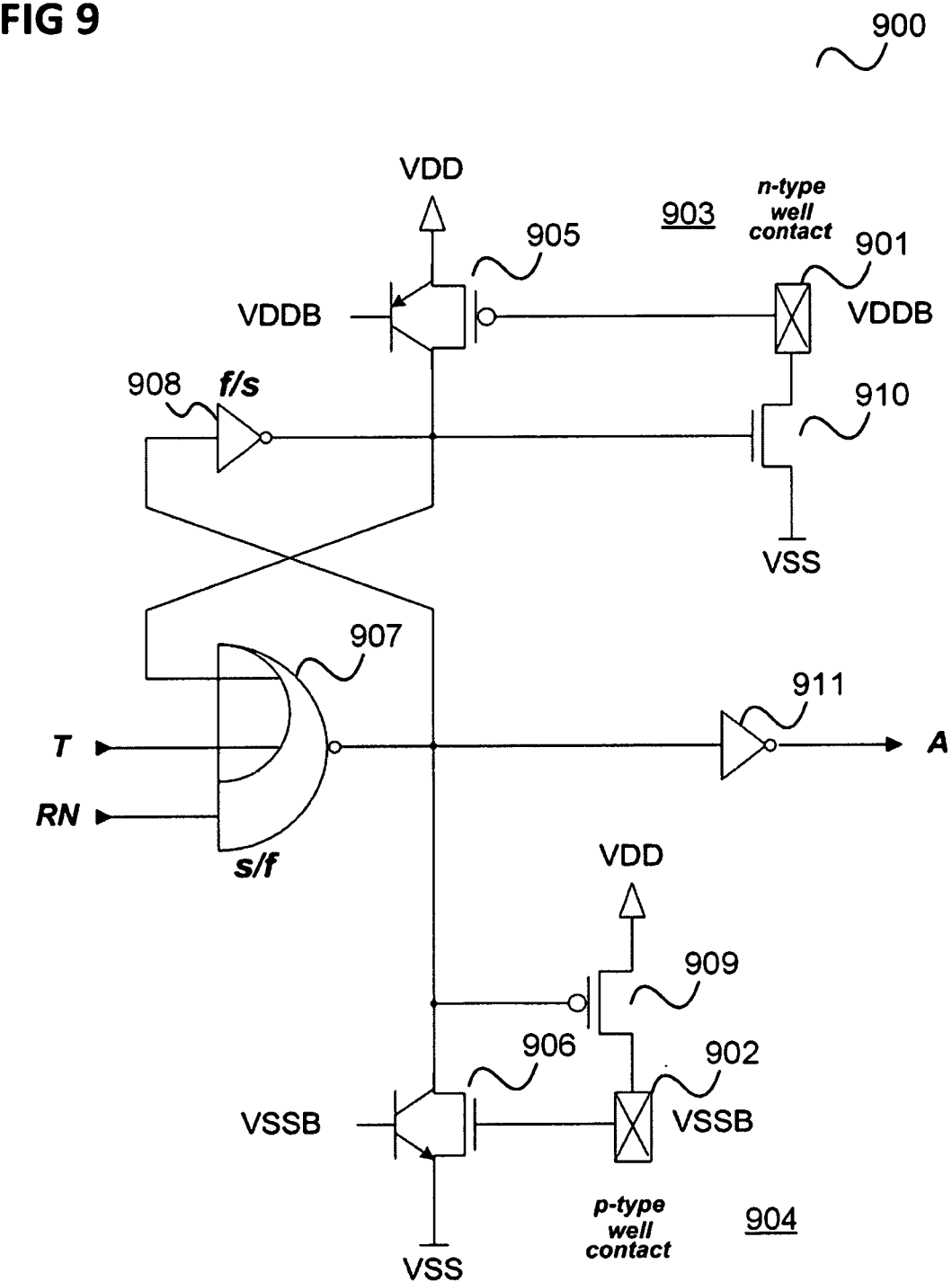
FIG. 9 shows a circuit which is a circuit extended by a test input and an alarm output by comparison with the circuit from FIG. 8.

FIG. 9 shows a circuit 900 that is a circuit extended by a test input and an alarm output by comparison with the circuit 800.

As in FIG. 8, a first p-type MOSFET 905 is provided in the n-type well and a first n-type MOSFET 906 is provided in the p-type well. The gate of the first p-type MOSFET 905 is connected to an n-type well contact 901 in an n-type well 903 and the gate of the first n-type MOSFET 906 is connected to a p-type well contact 902 in a p-type well 904.

The drain of the first p-type MOSFET 905 is connected to a first input of a gate 907, which receives a test input signal T at a second OR input, ORs the signals at the two OR inputs and NANDS the result with a reset input signal RN. The output of the gate 907 is connected to the drain terminal of the first n-type MOSFET 906 and to the input of a first inverter 908, the output of which is connected to the drain terminal of the first p-type MOSFET 905.

The output of the gate 907 is additionally connected to the gate of a second p-type MOSFET 909, the source of which is connected to the high supply potential VDD and the drain of which is connected to the p-type well contact 902.

The output of the first inverter 908 is additionally connected to the input of a second n-type MOSFET 910, the source of which is connected to the low supply potential VSS and the drain of which is connected to the n-type well contact 901.

In addition to the switchover of the RS flip-flop (or RS latch) of the circuit 500, in the circuit 900 the n-type well is pulled down and the p-type well is pulled up as soon as a failure attack has been detected (i.e. the RS flip-flop formed from gate 907 and inverter 908 has changed its state). As in the example in FIG. 6, a well sensor registers the resulting shift in the n-type well potential and RN can subsequently be activated, whereupon the pull-down/pull-up MOSFETs 909, 910 are deactivated again.

The output of the gate 907 is additionally connected to the input of a second inverter 911, the output of which is the alarm output of the failure attack detection circuit 900 with alarm output signal A.

In a test mode, the test input signal T is activated, which simulates a radiation attack, such that the triggering of an alarm or else the propagation of an alarm signal or the alarm handling can be tested.

Figure 10:
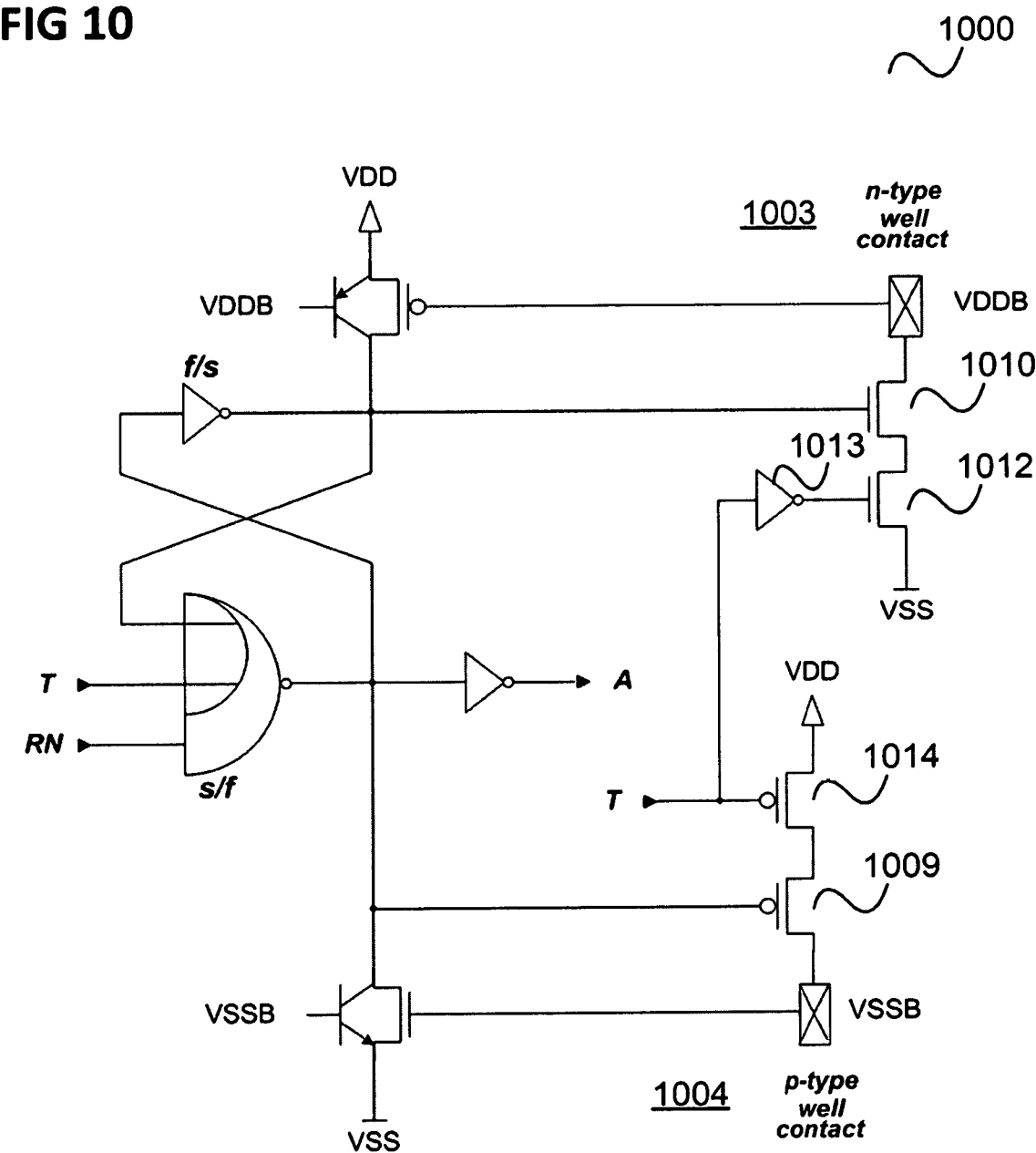
FIG. 10 shows a circuit which is a variant of the circuit from FIG. 9 in which the propagation of an alarm signal or the alarm handling can be tested, without a radiation attack being simulated.

FIG. 10 shows a circuit 1000 that is a variant of the circuit 900 in which the propagation of an alarm signal or the alarm handling can be tested, without a radiation attack being simulated, i.e. without the wells 1003, 1004 being subjected to charge reversal.

The circuit 1000 is largely identical to the circuit 900 with the difference that the source of the second n-type MOSFET 1010 is not directly connected to VSS, but rather via a third n-type MOSFET 1012, the gate of which is connected to the output of a third inverter 1013, to the input of which the test signal T is fed. In a similar manner, the source of the second p-type MOSFET 1009 is not directly connected to VDD, but rather via a third p-type MOSFET 1014, to the gate of which the test signal T is fed.

Figure 11:
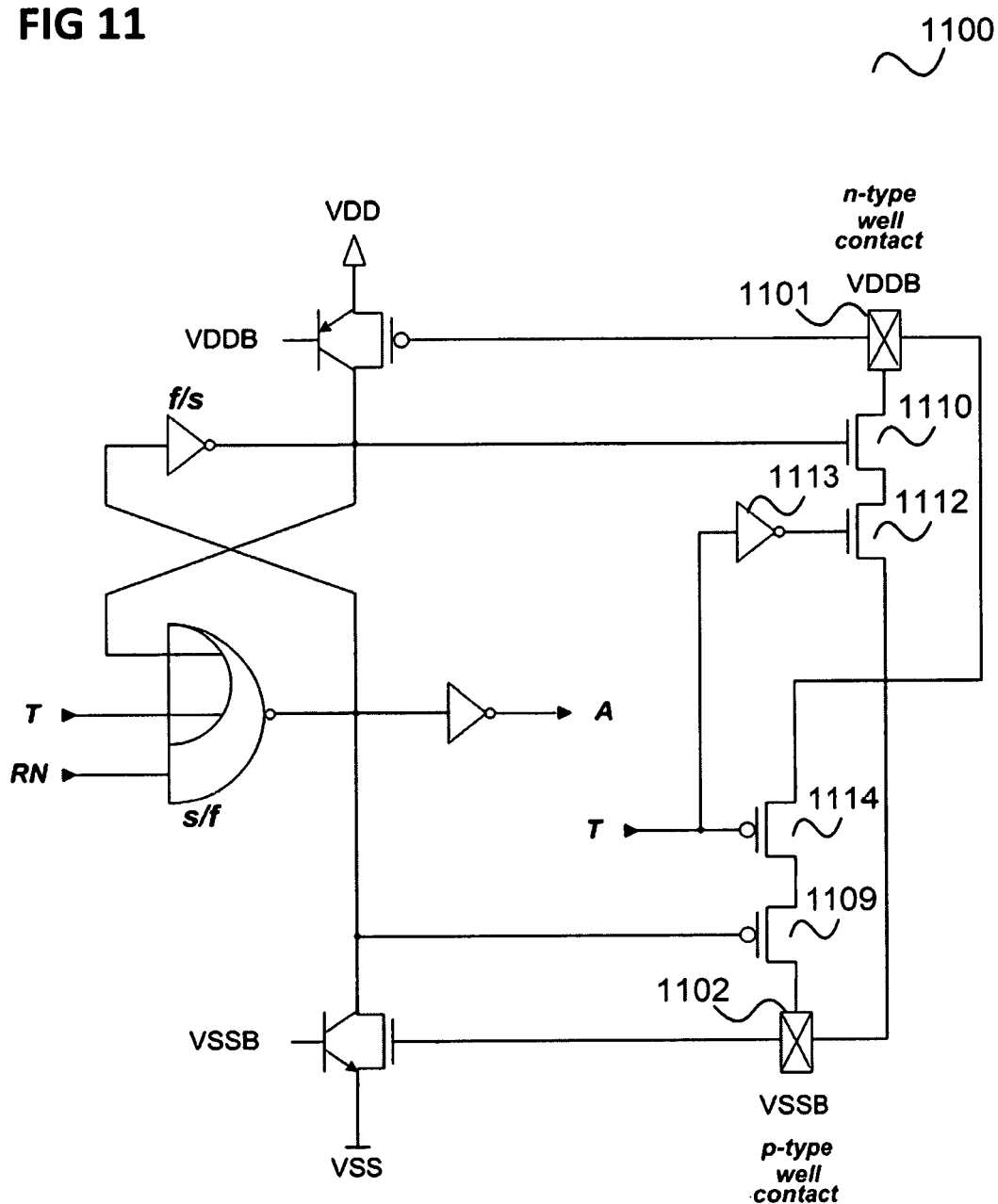
FIG. 11 shows a circuit which is a further variant of the circuit from FIG. 9 in which the propagation of an alarm signal or the alarm handling can be tested, without a radiation attack being simulated.

FIG. 11 shows a circuit 1100 that is a further variant of the circuit 900 in which the propagation of an alarm signal or the alarm handling can be tested, without a radiation attack being simulated, i.e. without the wells 1103, 1104 being subjected to charge reversal.

The circuit 1100 is largely identical to the circuit 900 with the difference that the source of the second n-type MOSFET 1110 is not connected to VSS, but rather can be connected to the p-type well contact 1102 via a third n-type MOSFET 1112, wherein the gate of the third n-type MOSFET 1112 is connected to the output of a third inverter 1113, to the input of which the test signal T is fed. In a similar manner, the source of the second p-type MOSFET 1109 is not connected to VDD, but rather can be connected to the n-type well contact 1101 via a third p-type MOSFET 1114, to the gate of which the test signal T is fed.

In the event of a radiation attack, therefore, the wells are not connected to the supply terminals, but rather short-circuited in order to amplify the effect of the radiation attack and to accelerate the reaction of a well sensor or to increase the failure detection sensitivity of the well sensor.

Figure 12:
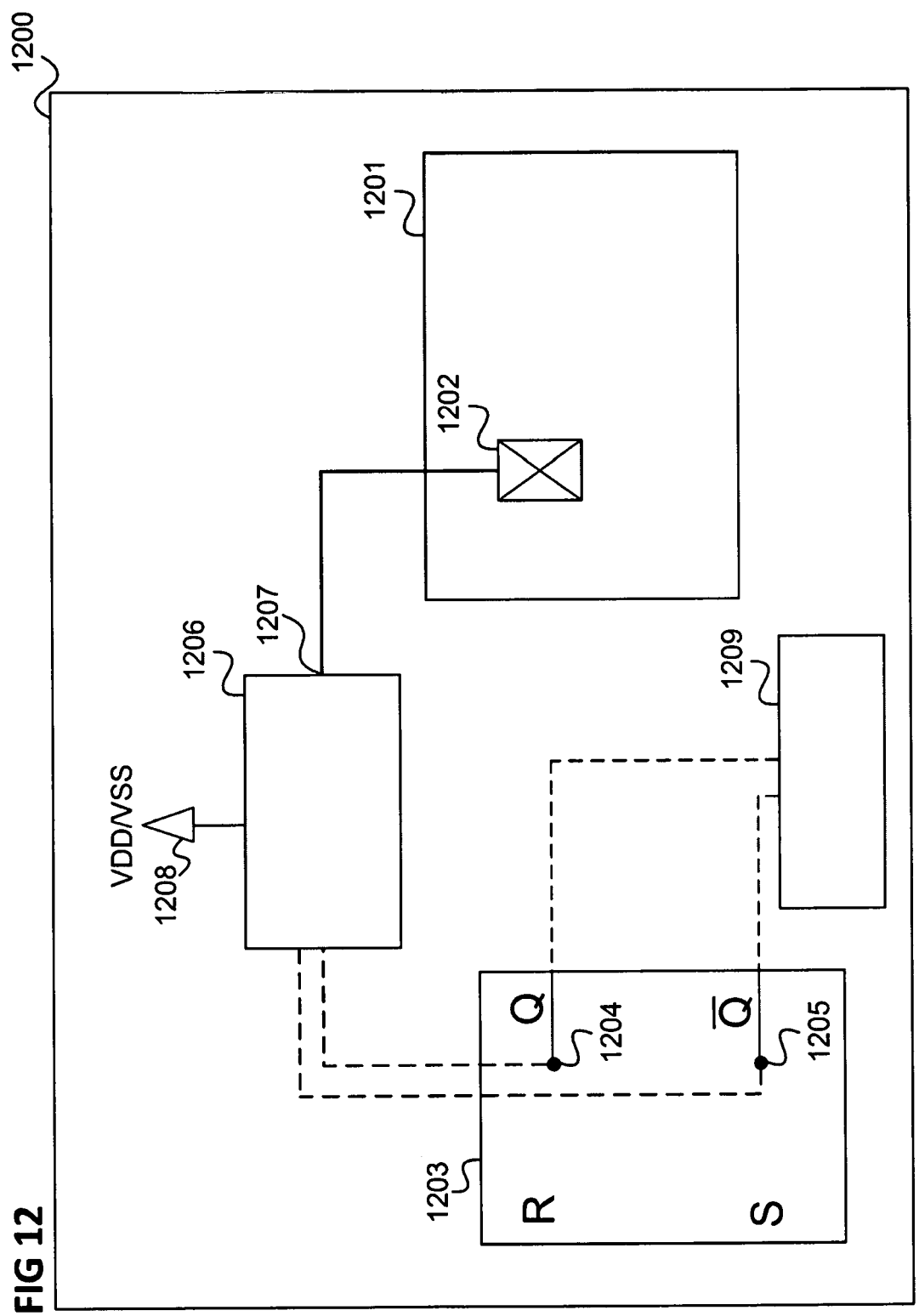
FIG. 12 shows a chip in accordance with one embodiment.
Figure 13:
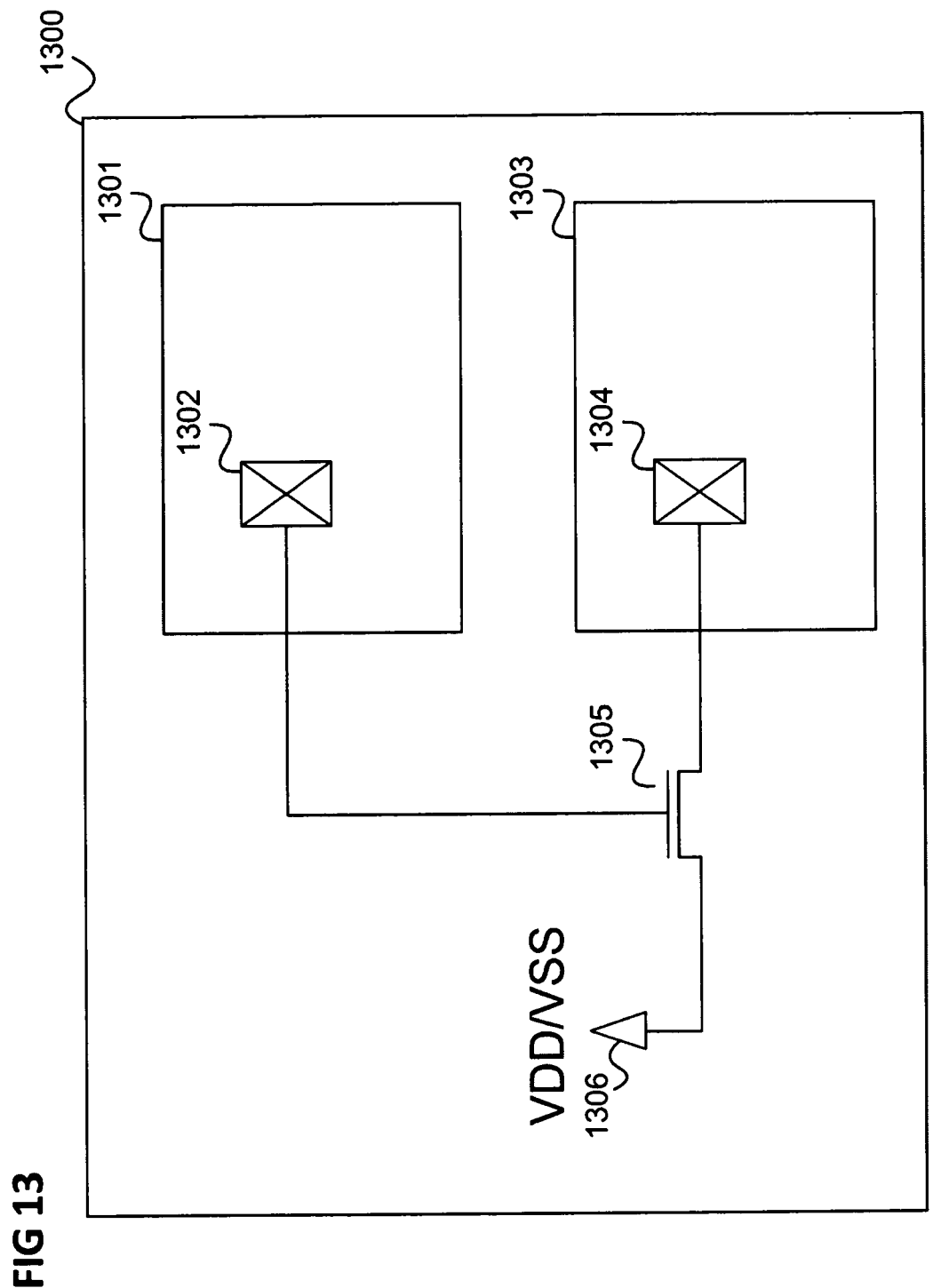
FIG. 13 shows a chip in accordance with a further embodiment.

In summary, in accordance with various embodiments, chips are provided such as are shown in FIGS. 12 and 13.

FIG. 12 shows a chip 1200 in accordance with one embodiment.

The chip 1200 comprises a substrate region 1201 having a substrate contact 1202 and also an RS latch 1203 having two complementary nodes 1204, 1205 representing a storage state of the RS latch.

The chip 1200 furthermore comprises a control circuit 1206, which comprises a control input 1207 and is configured to connect one of the complementary nodes 1204, 1205 to a supply potential 1208 depending on a potential at the control input 1207, wherein the control input 1207 is connected to the substrate contact 1202.

The chip 1200 furthermore comprises an output circuit 1209, which is connected to an output of the RS latch 1203 and is configured to trigger an alarm depending on the storage state of the RS latch 1203.

In accordance with various exemplary embodiments, an RS latch (or RS flip-flop) is connected to a substrate region, e.g. a well, such that a change in potential of the well influences the storage state of the RS latch. By way of example, the RS latch can be brought to a start state and a change in the potential of the substrate region (e.g. a deviation from a potential or potential range provided for the substrate region) causes the RS latch to toggle to the storage state that is complementary to the start state (e.g. from Q=1 to Q=0 or vice versa). An alarm circuit can output an alarm signal in reaction to such a change in the storage state or the changed storage state.

FIG. 13 shows a chip 1300 in accordance with a further embodiment.

The chip 1300 comprises a first doped substrate region 1301 having a first substrate terminal 1302, and a second substrate region 1303 having a second substrate terminal 1304, said second substrate region being doped complementarily to the first doped substrate region 1301.

In this case, doped complementarily should be understood to mean that one of the substrate regions 1301, 1303 is n-doped, and the other p-doped.

The chip furthermore comprises a field effect transistor 1305, the gate of which is connected to the first doped substrate region and is configured to connect the second substrate region 1303 to a supply terminal 1306 depending on the potential of the first substrate region 1301.

It should be noted that the field effect transistor 1305 need not be directly connected to the supply terminal 1306, rather even further components, e.g. further field effect transistors, can be provided, e.g. for deactivating the circuit or for reducing the sensitivity.

Depending on the doping of the first substrate region, the field effect transistor 1305 is an n-channel field effect transistor or a p-channel field effect transistor (p-channel for n-doped, n-channel for p-doped).

In accordance with various embodiments, a substrate region (e.g. a well) is subjected to charge reversal depending on the potential of a complementary substrate region (e.g. a complementary well). By this means, if the potential of a substrate changes on account of a radiation attack, for example, and as a result deviates from a provided potential by a certain magnitude, the other substrate region is also subjected to charge reversal, i.e. the charge-reversal effect of the radiation attack on the wells is amplified, such that the charge-reversal effect of the radiation attack spreads over a plurality of substrate regions and, as a result, can be discovered more easily by a detection circuit, for example a well sensor, or else the function of the chip is restricted merely by the spreading of the charge-reversal effect.

Some exemplary embodiments are specified below in summary.

Exemplary embodiment 1 is a chip such as is illustrated in FIG. 12.

Exemplary embodiment 2 is a chip in accordance with exemplary embodiment 1, wherein the substrate region is an n-doped well having an n-type well contact.

Exemplary embodiment 3 is a chip in accordance with exemplary embodiment 1, wherein the substrate region is a p-doped well having a p-type well contact.

Exemplary embodiment 4 is a chip in accordance with any of exemplary embodiments 1 to 3, wherein the output circuit is configured to output an alarm signal depending on the storage state of the RS latch.

Exemplary embodiment 5 is a chip in accordance with any of exemplary embodiments 1 to 4, wherein the output circuit is configured to subject the substrate region to charge reversal depending on the storage state of the RS latch, and the chip furthermore comprises a detection circuit configured to detect a charge reversal of the substrate region and, if it detects a charge reversal of the substrate region, to output an alarm signal.

Exemplary embodiment 6 is a chip in accordance with exemplary embodiment 4 or 5, furthermore comprising an alarm handling circuit configured to receive the alarm signal and, as a reaction to the alarm signal, to prevent a function of at least one component of the chip and/or to reset at least one component of the chip.

Exemplary embodiment 7 is a chip in accordance with any of exemplary embodiments 1 to 6, comprising an input circuit configured to bring the RS latch to a first storage state, wherein the output circuit is configured to trigger the alarm if the RS latch attains a second storage state complementary to the first storage state.

Exemplary embodiment 8 is a chip in accordance with exemplary embodiment 7, wherein the substrate region is an n-doped well having an n-type well contact and in the first storage state that one of the complementary nodes (510) has a low potential which is connected to the supply potential by the control circuit (505), the control input of which is connected to the n-type well contact (501), depending on the potential at the control input, wherein the supply potential is a high supply potential.

Exemplary embodiment 9 is a chip in accordance with either of exemplary embodiments 7 and 8, wherein the substrate region is a p-doped well having a p-type well contact and in the first storage state that one of the complementary nodes (511) has a high potential which is connected to the supply potential by the control circuit (506), the control input of which is connected to the p-type well contact (502), depending on the potential at the control input, wherein the supply potential is a low supply potential.

Exemplary embodiment 10 is a chip in accordance with any of exemplary embodiments 1 to 9, comprising:

an n-type well having an n-type well contact;

a p-type well having a p-type well contact;

a first control circuit, which comprises a first control input and is configured to connect a first of the complementary nodes to a high supply potential, wherein the first control input is connected to the n-type well contact; and a second control circuit, which comprises a second control input and is configured to connect a second of the complementary nodes to a low supply potential, wherein the second control input is connected to the p-type well contact.

Exemplary embodiment 11 is a chip such as is illustrated in FIG. 13.

Exemplary embodiment 12 is a chip in accordance with exemplary embodiment 11, wherein the first substrate region is n-doped and the second substrate region is p-doped, the supply terminal is a supply terminal for a high supply potential, and the field effect transistor is configured to connect the second substrate region to the supply terminal if the first substrate region lies below the high supply potential by a predefined threshold value.

Exemplary embodiment 13 is a chip in accordance with exemplary embodiment 11, wherein the first substrate region is p-doped and the second substrate region is n-doped, the supply terminal is a supply terminal for a low supply potential, and the field effect transistor is configured to connect the second substrate region to the supply terminal if the first substrate region lies above the low supply potential by a predefined threshold value.

Exemplary embodiment 14 is a chip in accordance with exemplary embodiment 11 or 12, wherein the first substrate region is an n-doped well having an n-type well contact, and the second substrate region is a p-doped well having a p-type well contact.

Exemplary embodiment 15 is a chip in accordance with exemplary embodiment 11 or 13, wherein the first substrate region is a p-doped well having a p-type well contact, and the second substrate region is an n-doped well having an n-type well contact.

Exemplary embodiment 16 is a chip in accordance with any of exemplary embodiments 11 to 15, furthermore comprising a deactivation circuit configured to prevent the second substrate region from being connected to the supply terminal depending on a deactivation signal.

Exemplary embodiment 17 is a chip in accordance with any of exemplary embodiments 11 to 16, comprising a field effect transistor arrangement comprising a plurality of field effect transistors connected in series, wherein each field effect transistor comprises a gate which is connected to the first substrate region and is configured to connect the second substrate region to the supply terminal depending on the potential of the first substrate region.

Exemplary embodiment 18 is a chip in accordance with any of exemplary embodiments 11 to 17, comprising a plurality of field effect transistor arrangements connected in parallel, wherein each field effect transistor arrangement comprises one or a plurality of field effect transistors connected in series, wherein each field effect transistor comprises a gate which is connected to the first substrate region and is configured to connect the second substrate region to the supply terminal depending on the potential of the first substrate region.

Exemplary embodiment 19 is a chip in accordance with any of exemplary embodiments 11 to 18, wherein the chip furthermore comprises a detection circuit configured to detect a charge reversal of the second substrate region and, if it detects a charge reversal of the second substrate region, to output an alarm signal.

Exemplary embodiment 20 is a chip in accordance with exemplary embodiment 19, furthermore comprising an alarm handling circuit configured to receive the alarm signal and, as a reaction to the alarm signal, to prevent a function of at least one component of the chip and/or to reset at least one component of the chip.

It should be noted that all of the exemplary embodiments mentioned above can be combined arbitrarily with one another.

Although the subject matter of the disclosure has been shown and described primarily with reference to specific embodiments, it should be understood by those familiar with the technical field that numerous modifications can be made thereto with regard to configuration and details, without departing from the essence and scope of the disclosure as defined by the following claims. The scope of the disclosure is therefore determined by the appended claims, and the intention is to encompass all modifications that come under the literal meaning or the scope of equivalence of the claims.

The invention claimed is:

1. A chip, comprising:
   a substrate region having a substrate contact;
   an RS latch having two complementary nodes representing a storage state of the RS latch;
   a control circuit comprising a control input connected directly to the substrate contact and configured to connect one of the complementary nodes to a supply potential depending on a potential at the control input; and
   an output circuit connected to an output of the RS latch and configured to trigger an alarm depending on the storage state of the RS latch.

2. The chip as claimed in claim 1, wherein the substrate region is an n-doped well having an n-type well contact.

3. The chip as claimed in claim 1, wherein the substrate region is a p-doped well having a p-type well contact.

4. The chip as claimed in claim 1, wherein the output circuit is configured to output an alarm signal depending on the storage state of the RS latch.

5. The chip as claimed in claim 1,
   wherein the output circuit is configured to subject the substrate region to charge reversal depending on the storage state of the RS latch, and
   wherein the chip further comprises a detection circuit configured to detect a charge reversal of the substrate region and, if it detects a charge reversal of the substrate region, to output an alarm signal.

6. The chip as claimed in claim 4, further comprising an alarm handling circuit configured to receive the alarm signal and, as a reaction to the alarm signal, to prevent a function of at least one component of the chip or to reset at least one component of the chip.

7. The chip as claimed in claim 1, further comprising an input circuit configured to bring the RS latch to a first storage state, wherein the output circuit is configured to trigger the alarm if the RS latch attains a second storage state complementary to the first storage state.

8. The chip as claimed in claim 7, wherein the substrate region is an n-doped well having an n-type well contact and in the first storage state one of the complementary nodes has a low potential which is connected to the supply potential by the control circuit, the control input of which is connected to the n-type well contact, depending on the potential at the control input, wherein the supply potential is a high supply potential.

9. The chip as claimed in claim 7, wherein the substrate region is a p-doped well having a p-type well contact and in the first storage state one of the complementary nodes has a high potential which is connected to the supply potential by the control circuit, the control input of which is connected to the p-type well contact, depending on the potential at the control input, wherein the supply potential is a low supply potential.

10. The chip as claimed in claim 1, further comprising:
    an n-type well having an n-type well contact;
    a p-type well having a p-type well contact; and
    wherein the control circuit comprises:
      a first control circuit comprising a first control input and configured to connect a first of the complementary nodes to a high supply potential, wherein the first control input is connected to the n-type well contact; and
      a second control circuit comprising a second control input and configured to connect a second of the complementary nodes to a low supply potential, wherein the second control input is connected to the p-type well contact.

\* \* \* \* \*